Aug. 8, 1944.   H. W. HEM   2,355,292
WEIGHING SCALE
Filed July 26, 1940   5 Sheets-Sheet 1
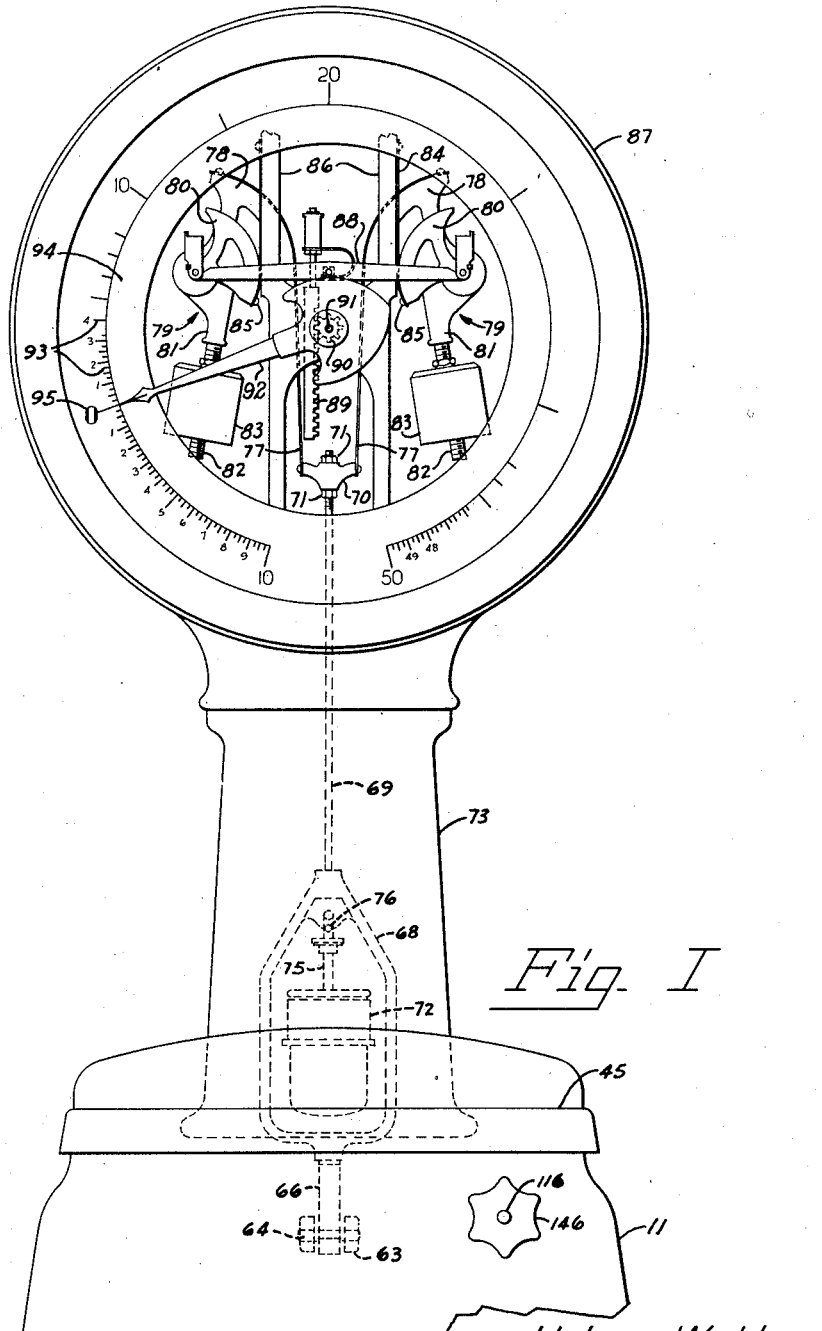
Fig. I
Halvor W. Hem
INVENTOR
BY Marshall & Marshall
ATTORNEYS Aug. 8, 1944.　　　H. W. HEM　　　2,355,292
WEIGHING SCALE
Filed July 26, 1940　　　5 Sheets-Sheet 2
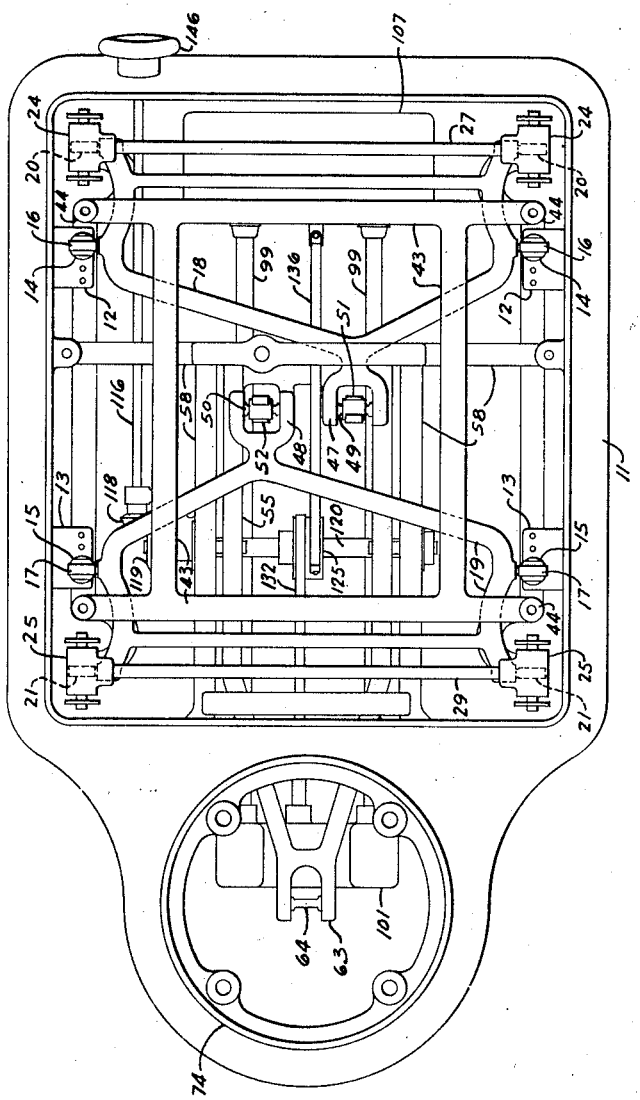
Fig. II
Halvor W. Hem
INVENTOR
BY Marshall & Marshall
ATTORNEYS

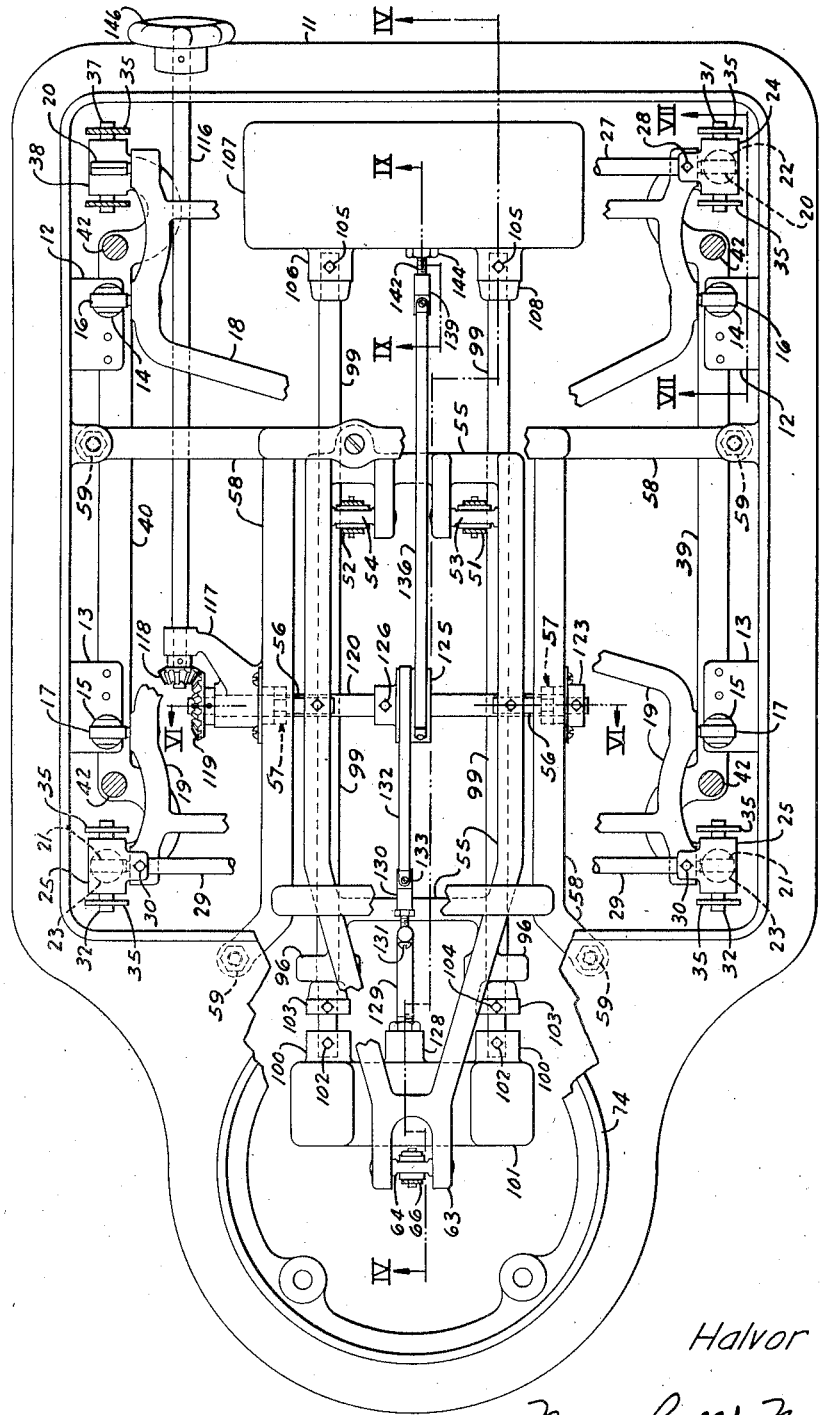

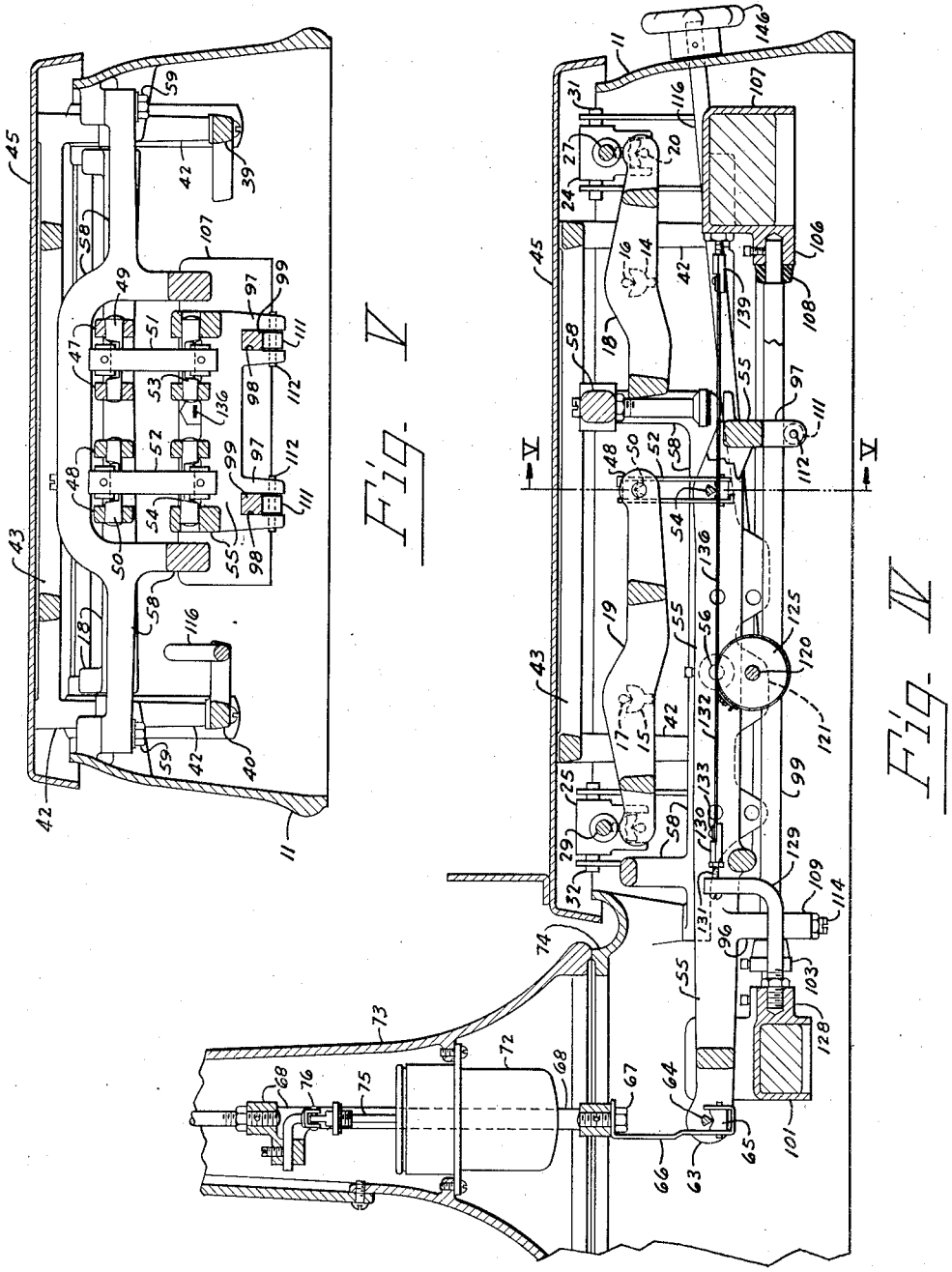

Aug. 8, 1944.   H. W. HEM   2,355,292
WEIGHING SCALE
Filed July 26, 1940   5 Sheets-Sheet 5
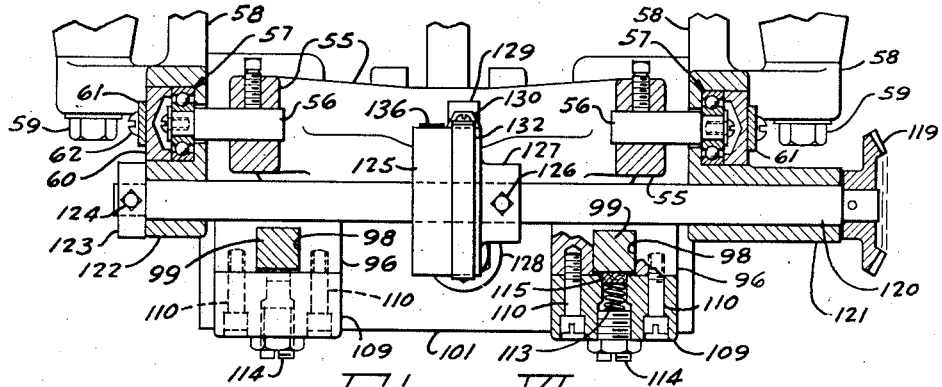
Fig. VI
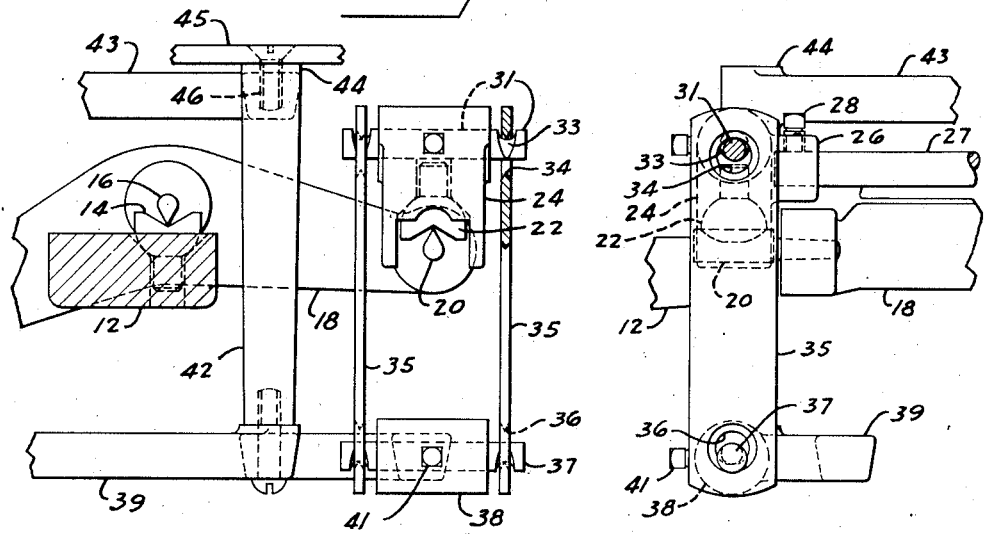
Fig. VII   Fig. VIII
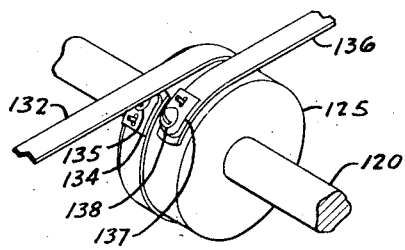
Fig. X
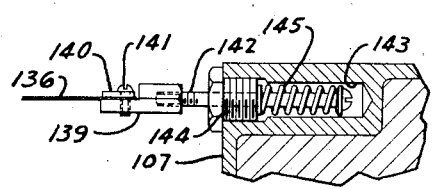
Fig. IX
Halvor W. Hem
INVENTOR
BY Marshall & Marshall
ATTORNEYS Patented Aug. 8, 1944

2,355,292

UNITED STATES PATENT OFFICE 2,355,292

WEIGHING SCALE

Halvor W. Hem, Toledo, Ohio, assignor to Toledo Scale Company, Toledo, Ohio, a corporation of New Jersey Application July 26, 1940, Serial No. 347,676

14 Claims. (Cl. 265—27)

This invention relates generally to weighing scales, and more particularly to scales employed in assembling batches comprising a plurality of materials. In many processes, especially in the chemical industries, batches comprising definite amounts of several different materials are required in continuous streams. It is essential that the amounts of the ingredients in these batches be very carefully determined. Many different types of so-called "batching" scales have been used for this purpose. Such scales are usually provided with a number of beams, each cooperating with a poise which must be set to definite marks on the beam for the different materials.

Even the most careful operator however will make mistakes in setting the poise when his attention lessens due to fatigue and monotony of the operation. The errors in the composition of the batch which thus result lead to spoiled products or at least to products in which the desired characteristics are lacking to a great extent.

The principal object of the present invention is therefore the provision of improved means in a batching or compounding scale which because of readily visible means avert to the greatest possible extent mistakes in the determination of the quantities of the ingredients.

Another object is the provision of improved counterpoising or "back-weighting" means.

Still another object is the provision of readily accessible means for actuating such counterpoising or "back-weighting" means.

Another object is the provision of a graduated indicia bearing chart which facilitates the taring of the weight of a container.

These, and other objects and advantages will be apparent from the following description in which reference is had to the accompanying drawings, illustrating preferred embodiments of the invention and in which similar reference numerals refer to similar parts throughout the several views.

Referring to the drawings:

Fig. I is a front elevational view of a device embodying the invention.

Fig. II is a plan view of the base with the platform removed and showing in particular the arrangements of the load supporting levers.

Fig. III is an enlarged plan view of the base mechanism, the platform being removed and the platform supporting levers and spider being broken away to show in greater detail the manipulative counterbalancing mechanism.

Fig. IV is an enlarged side elevational view through the base mechanism and of a fragment of the column, sectioned substantially along the line IV—IV of Fig. III.

Fig. V is a transverse section therethrough substantially along the line V—V of Fig. IV.

Fig. VI is a transverse section along the line VI—VI of Fig. III, showing in detail a portion of the counterpoise actuating means.

Fig. VII is an enlarged fragmentary side elevational view of the platter spider suspension means as seen from along the line VII—VII of Fig. III.

Fig. VIII is an end elevational view thereof.

Fig. IX is an enlarged fragmentary side elevational view of the actuating ribbon clamping and tensioning means sectioned along the line IX—IX of Fig. III; and, Fig. X is a perspective view of the ribbon actuating drum.

Referring to the drawings in detail:

The scale comprises a base 11, preferably a rigid iron casting. Bosses 12 and 13, which extend inwardly from the wall of the base, are provided with machined sockets in which self-aligning bearings 14 and 15 are seated upon which fulcrum pivots 16 and 17 of platform levers 18 and 19 respectively are rockably mounted. The outer ends of these levers 18 and 19 are provided with upwardly directed load pivots 20 and 21 (Figures VII and VIII). These pivots 20 and 21 engage bearings 22 and 23 seated in sockets in bearing blocks 24 and 25. The bearing blocks 24 are provided with inwardly directed apertured bosses 26. Connecting rods 27, which extend into these apertures, are locked therein by means of set screws 28 thus tying the bearing blocks 24 rigidly together. The bearing blocks 25 are similarly assembled into a unit by means of a connecting rod 29 and set screws 30.

Extending through the bearing blocks 24 and 25, and locked therein, are pins 31 and 32 respectively. The portions which extend beyond the faces of these blocks are milled as at 33 (Figures VII and VIII) to provide bearings for countersunk apertures 34 in the upper ends of links 35 whose lower ends, equipped with similar apertures 36, engage pins 37, which are similar to the pins 31 and 32, extending through cylindrical portions 38 of spider supporting brackets 39 and 40. Set screws 41 serve to securely lock the pins 37 in the portions 38 of the spider supporting brackets 39 and 40.

It will be seen from the aforegoing that one of these brackets is suspended from each side of the levers 18 and 19 extending at right angles to their rocking axes and serve to support the downwardly extending legs 42 of a platform supporting spider 43 which, by means of bosses 44 on its upper face, supports a platform 45 which is securely fastened thereto by countersunk head screws 46 and serves to receive a load to be weighed. The inner ends of the levers 18 and 19 terminate in forked nose portions 47 and 48 spanned by pivots 49 and 50 respectively (Figures II and V). These pivots engage suitable bearings in the upper ends of stirrups 51 and 52 whose lower ends, equipped with suitable bearings, engage pivots 53 and 54 spanning bifurcated portions of an extension lever 55. For rockingly supporting this extension lever, it is provided with laterally extending studs 56 whose outer ends are tenoned and clamped to the inner races of antifriction ball bearings 57. These ball bearings are situated in counterbored aligned holes in a bracket 58 fastened by bosses extending from the interior walls of the base 11 by means of bolts 59. The ball bearings 57 are held in proper position in the counterbored holes by means of hollow plugs 60, clamp plates 61 and screws 62.

The opposite end of the extension lever 55 terminates in a nose comprising short spaced arms 63 supporting a power pivot 64 which engages a bearing 65 mounted in the lower end of a stirrup-like member 66 dependingly secured, by means of a bolt 67, to the lower end of a yoke 68 (Figures I and IV). The upper end of this yoke, by means of a connecting rod 69, is locked to an equalizer 70 by nuts 71. The yoke straddles a dashpot 72 located within and bolted to bosses of a column 73 erected upon an extending deck portion 74 of the base 11. The usual dashpot plunger 75 is connected to the yoke as at 76 in a well known manner. The function of dashpots in weighing scales is well known and requires no further description.

The equalizer 70 has clamped to its opposite faces the lower ends of ribbons 77 whose upper ends overlie and are clamped to the upper ends of arcuate faces of power sectors 78. These power sectors form parts of automatically functioning load counterbalancing pendulums 79. Each of these pendulums comprises additionally a pair of fulcrum sectors 80 and a pendulum body 81 having a depending stem 82 upon which a pendulum weight 83 is adjustably threaded. Ribbons 84, which overlie and are clamped as at 85 to the lower ends of arcuate faces of the fulcrum sectors 80, serve to suspendingly support the pendulums 79 from a pendulum frame 86 which is bolted in the interior of a substantially watchcase-shaped housing 87 surmounting the column 73. A frame 88, which pivotally engages the pendulums 79 at their centers of rotation, supports a rack 89 whose teeth mesh with the teeth of a pinion 90 pinned on a shaft 91 which is mounted in antifriction ball bearings (not shown) in the pendulum frame 86.

To indicate weight values, that portion of the shaft 91 which projects beyond the forward ball bearing in the frame 86 has clamped to it an indicator 92 which cooperates with a series of indicia 93 printed or otherwise marked on a chart 94 bolted to suitable bosses in the interior of the housing 87 immediately in back of the indicator 92. For a reason which will later become clear, a zero indicium 95 of the series 93 is so located on the chart that the indicia of the series 93 extend on both sides thereof.

The mechanism thus far described comprises a weighing scale of well known type which is capable of determining weights of loads within the counterbalancing capacity of the pendulums 79 when placed on the platform 45.

To accomplish the objects primarily stated, the spaced arms of the extension lever 55, adjacent its nose or power end, are provided with depending substantially rectangular boss-like projections 96 (Figures III and VI) and similar projections 97 adjacent the opposite end (Figure V). The projections 96 and 97 are so positioned on each side of the longitudinal axis of the extension lever 55 that aligned grooves 98 may be milled therein, parallel to this longitudinal axis, for the reception of rectangular bars 99. The rearward ends of these bars 99 are turned cylindrically. These cylindrical portions extend into and are locked in drilled holes in laterally projecting bosses 100 of a weight 101 by means of set screws 102. The weight 101 comprises a shell-like casing which is adapted to be loaded with lead and contoured to straddle the converging arms of the extension lever 55. Also seated upon this cylindrical portion of these bars are bumper stops 103 which preferably have a rubber face. These stops 103 are slightly adjustable and provided with set screws 104 so that they may be locked in adjusted position to limit the movement of the weight 101 in one direction. Cylindrical tenons on the opposite ends of the bars 99 are locked, by means of set screws 105, in drilled holes in laterally extending bosses 106 of a second weight 107 which is also a shell-like casing adapted to be filled with lead. Interposed between the shoulders formed by the cylindrical portion and the face of the laterally extending bosses 106 are rubber bumpers 108.

To retain the bars 99 in the grooves 98 in the bosses 96, a block 109 is screwed to the bottom of the boss 96 by means of countersunk head screws 110. Rollers 111, freely mounted on pins 112 which extend across the legs formed in the bosses 97 when the groove 98 is machined therein, are provided to retain the opposite end of these bars in the slots 98. To maintain the center of gravity of the weight assembly comprising the bars 99 and the weights 101 and 107 in adjusted position, each of the blocks 109 is provided with an additional counterbored aperture, between the apertures for the bolts 110, in which is positioned a helical spring 113 held therein by a headless screw 114 threaded into the counterbored aperture, there being a plug 115 of relatively soft material, such as fiber, interposed between the end of the spring 113 and the bar 99. By adjusting the headless screw 114 the spring 113 may be more or less compressed so that the plug 115 will frictionally engage the bar 99 and hold the assembly against accidental gravitational movement. In order to shift the weight assembly along the longitudinal axis of the extension lever 55 to counterbalance or back-weight a load on the platform 45 a rod 116, which penetrates the front wall of the base 11, has its other end supported in an aperture of an arm 117 which is an integral portion of the bracket 58. The rod 116 has a bevel pinion 118 pinned to that portion projecting through the arm 117. The teeth of this bevel pinion mesh with the teeth of a small bevel gear 119 fixed on the tenoned end of a shaft 120 which is rotatably mounted in aligned bores in depending portions 121 and 122 of the bracket 58. These bores are located in this bracket so that they are bisected by a plane passing vertically through the axis of the ball bearings 57. A collar 123 is locked to the opposite tenoned end of the shaft 120 projecting beyond the depending portion 122 by means of a set screw 124, to prevent axial movement of this shaft. Mounted on the shaft 120 is a drum 125. This drum is locked in position by a set screw 126 threaded through an aperture in a laterally extending boss 127.

The weight 101, in addition to the laterally extending bosses 100, has a similarly extending boss 128 and this boss has threaded therein one end of a rod 129 whose other end is bent upwardly at right angles and forms an anchor for a clamp 130 which is adjustably secured to the member 129 by a screw 131 passing freely through an opening in the up-turned end of the member 129. One end of a flexible metallic steel ribbon 132 is secured to the clamp 130 as at 133. The other end of this ribbon tangentially engages the drum 125 and overlies a portion of its cylindrical surface to which it is clamped by means of a clip 134 and screw 135. A similar flexible metallic ribbon 136 has one of its ends clamped to the drum 125 by means of a clip 137 and screw 138 and extends in the direction opposite that of ribbon 132, its other end being secured to a clamp 139 by means of a clip 140 and screw 141. The clamp 139 is retained by a screw 142 having one end threaded therein. The major portion of this screw 142 is positioned in a bore 143 extending horizontally into the weight 107 (Figures III, IX). This screw passes through an opening in a short bolt 144 threaded into a counterbored portion of the bore 143, there being a helical spring 145 interposed between the head of the screw 142 and the end of the bolt 144 for the purpose of exerting a uniform and constant tension on the ribbons 136 and 132. To operate the weight assembly through the bevel gearing, the shaft 120 and the ribbons 132 and 136, that portion of the rod 116 projecting beyond the wall of the base 11 carries a handwheel 146.

The device may be employed in various ways; however, in processes which are continuous, batches of materials must be assembled very rapidly and with the least expenditure of labor. For this reason, conveyors which operate at a speed permitting a continuous uniform flow are usually employed. The containers in which batches of materials are assembled usually are marked with their own, that is their tare weight. By way of example, it is assumed that the device is employed for determining batches comprising 30 pounds of one material, 23 pounds of another material and 15 pounds 8 ounces of a third material. As the empty container on the conveyor approaches the device the operator notes the weight marked thereon which, in this example it is assumed, is 6 pounds 4 ounces. He immediately turns the handwheel 146 in an anticlockwise direction, it being assumed that the indicator 92 is in registration with the zero indicium 95. Rotation of the handwheel through the rod 116, the bevel pinion 118 and bevel gear 119 rotates the shaft 120 and the drum 125 fixed thereon and through the ribbon 132 the manipulative counterpoising or back-weighting assembly, comprising the rods 99 and the weights 101 and 107, is shifted towards the front of the scale changing the location of its center of mass until the "pull" initially exerted on the pendulums 79 through the connection rod 69 has diminished sufficiently to permit the pendulums, which in their zero or null position are somewhat elevated, to lower changing the moment exerted by these pendulums so that the indicator 92, which is actuated by these pendulums, has moved in an anticlockwise direction into registration with the 6 pound 4 ounce indicium in the negative portion of the series 93 which extends below the zero indicium 95. As the container reaches the device the operator places it on the platform 45, its weight immediately offsets the "back-weight" and the pendulums 79 rise until the indicator 92, moving in a clockwise direction, again points to the zero indicium 95 since the moment occasioned by the weight of the container is exactly equal to the moment occasioned by the "back-weight." The operator now places sufficient of the first material of the batch in the container until the indicator, again moving in a clockwise direction, points to the 30 pound indicium in the series 93. He again offsets this weight by turning the handwheel 146 and shifts the "back-weight" assembly until it counterbalances the 30 pounds of material in the container and the indicator again points to the zero indicium. He then fills in an amount of the second material until the indicator points to the 23 pound indicium on the chart and by again turning the handwheel 146 returns the indicator to the zero indicium. Sufficient of the third material is then placed into the container until the indicator registers with the 15 pound 8 ounce indicium.

All of the materials are now assembled and the operator places the filled container on the conveyor for removal. The next empty container has now reached the device and the operator back-weights or offsets its tare weight in the manner hereinbefore described and repeats the other operations.

Having described the invention, I claim:

1. In a device of the class described, in combination, a base, a housing erected upon said base, load counterbalancing mechanism within said housing, load indicating means comprising a chart and a rotatable indicator actuated by said load counterbalancing mechanism, said chart having a zero indicium and series of indicia extending on both sides of said zero indicium, load supporting levers mounted within said base, a platform adapted to receive a load pivotally mounted upon said load supporting levers and positioned above said base, said load counterbalancing mechanism being adapted normally to hold said indicator in registration with said zero indicium when no load is on said platform, means including an extension lever pivotally mounted in said base for connecting said load supporting levers to said load counterbalancing mechanism, a weighted frame slidably mounted on said extension lever, means for nonreactively sliding said weighted frame on said extension lever whereby the center of mass of said extension lever and said frame is shifted to influence said load counterbalancing mechanism and cause said load counterbalancing mechanism to rotate said indicator into registration with an indicium on that side of said zero indicium opposite to which the load counterbalancing mechanism rotates said indicator under the influence of a load on said platform, said means for nonreactively sliding said weighted frame on said extension lever comprising a shaft mounted within said base, a drum fixed upon said shaft and having its periphery substantially in coincidence with a horizontal plane passing through the longitudinal axis of said extension lever, a pair of flexible metallic ribbons positioned substantially in such horizontal plane each having one end secured to said weighted frame and each having its other end tangentially engaging the periphery of said drum and being clamped thereto in a manner so that rotation of said shaft and drum imparts sliding movement to said weighted frame, a bevel gear secured to the end of said shaft, a second bevel gear meshing with said first mentioned bevel gear, a shaft secured to said second bevel gear having a portion extending exteriorly of said base and a handwheel secured to said extending portion of said shaft on said second bevel gear, said shafts and gears being located within said base below said platform.

2. In a device of the class described, in combination, a base, a housing erected upon said base, load counterbalancing mechanism within said housing, load indicating means comprising a chart and a rotatable indicator actuated by said load counterbalancing mechanism, said chart having a zero indicium and series of indicia extending on both sides of said zero indicium, load supporting levers mounted within said base, a platform adapted to receive a load pivotally mounted upon said load supporting levers and positioned above said base, said load counterbalancing mechanism being adapted normally to hold said indicator in registration with said zero indicium when no load is on said platform, means including an extension lever rockably mounted within said base for connecting said load supporting levers to said load counterbalancing mechanism, a weighted frame slidably mounted on said extension lever and means for nonreactively sliding said weighted frame on said extension lever whereby the center of mass of said extension lever and said frame is shifted to influence said load counterbalancing mechanism and cause said load counterbalancing mechanism to rotate said indicator into registration with an indicium on that side of said zero indicium opposite to which the load counterbalancing mechanism rotates said indicator under the influence of a load on said platform, said means for nonreactively sliding said weighted frame on said extension lever comprising a shaft mounted within said base, a drum fixed upon said shaft and having its periphery substantially in coincidence with a horizontal plane passing through the longitudinal axis of said extension lever, a pair of flexible metallic ribbons lying substantially in such horizontal plane, each having one end secured to said weighted frame and each having its other end tangentially engaging the periphery of said drum and being clamped thereto in a manner so that rotation of said shaft and drum imparts sliding movement to said weighted frame.

3. In a device of the class described, in combination, a base, a housing erected upon said base, load counterbalancing mechanism within said housing, load indicating means comprising a chart and a rotatable indicator actuated by said load counterbalancing mechanism, said chart having a zero indicium and series of indicia extending on both sides of said zero indicium, load supporting levers mounted within said base, a platform adapted to receive a load pivotally mounted upon said load supporting levers and positioned above said base, said load counterbalancing mechanism being adapted normally to hold said indicator in registration with said zero indicium when no load is on said platform, means including an extension lever pivotally mounted within said base for connecting said load supporting levers to said load counterbalancing mechanism, a weighted frame slidably mounted on said extension lever and means for nonreactively sliding said weighted frame on said extension lever whereby the center of mass of said extension lever and said frame is shifted to influence said load counterbalancing mechanism and cause said load counterbalancing mechanism to rotate said indicator into registration with an indicium on that side of said zero indicium opposite to which the load counterbalancing mechanism rotates said indicator under the influence of a load on said platform, said nonreactive sliding means being located substantially within said base and below said platform.

4. In a device of the class described, in combination, a base, a housing mounted upon said base, a pair of load supporting levers mounted in said base an extension lever mounted in said base and operatively connected to said load supporting levers, a platform mounted on said load supporting levers and positioned above said base, automatic load counterbalancing mechanism in said housing, means for connecting said load counterbalancing mechanism to said extension lever and manipulative load counterbalancing mechanism shiftingly supported on said extension lever comprising an elongated weighted frame and means for shifting said frame on said extension lever, said shifting means comprising a rotatable shaft, a drum on said shaft, a plurality of flexible metallic ribbons extending in opposition directions, each of said ribbons having one end connected to said drum and its other end to one end of said weighted frame and means for rotating said shaft and drum including a handle on the exterior of said base below said platform, said ribbons extending tangentially from said drum and said shaft being so positioned that the point of tangency of said ribbons and said drum is in coincidence with the rocking axis of said extension lever.

5. In a device of the class described, in combination. a base, a housing mounted upon said base, a pair of load supporting levers mounted in said base an extension lever mounted in said base and operatively connected to said load supporting levers, a platform mounted on said load supporting levers and positioned above said base, automatic load counterbalancing mechanism in said housing, means for connecting said load counterbalancing mechanism to said extension lever and manipulative load counterbalancing mechanism shiftingly supported on said extension lever comprising an elongated weighted frame, means for shifting said frame on said extension lever, said shifting means comprising a rotatable shaft, a drum on said shaft, a plurality of flexible metallic ribbons extending in opposite directions, each of said ribbons having one end connected to said drum and its other end to one end of said weighted frame and means for rotating said shaft and drum including a handle on the exterior of said base below said platform.

6. In a device of the class described, in combination, a base, a housing mounted upon said base, load supporting levers in said base, a platform supported upon said levers and positioned above said base, automatic load counterbalancing means stationed within said housing, manipulative load counterbalancing means cooperatively secured to said levers in said base, means connecting said levers and said automatic load counterbalancing mechanism and means within said base and a handwheel on the exterior of said base for actuating said manipulative load counterbalancing means, said manipulative load counterbalancing means comprising an elongated member, a weight secured to each end thereof and means for slidingly mounting said elongated member on said levers in said base.

7. In a device of the class described, in combination, a base, a housing mounted upon said base, load supporting levers in said base, a platform supported upon said levers and positioned above said base, automatic load counterbalancing means stationed within said housing, a counterbalancing weight slidably mounted on one of said levers in said base for applying within its capacity variable amounts of "back-weight" to said levers, means connecting said levers and said automatic load counterbalancing mechanism and means employing a tape drive independent of said levers within said base including a handwheel on the exterior of said base below said platform for actuating said counterbalancing weight, said actuating means being adapted to actuate said counterbalancing weight nonreactively with respect to said levers.

8. In a device of the class described, in combination, a base, a column on said base, a housing supported on said column, load counterbalancing means mounted in said housing, load supporting levers mounted in said base, an extension lever rockably mounted in said base, a load receiver supported on said load supporting levers and located above said base, means connecting said extension lever to said load counterbalancing means, means connecting said load supporting levers to said extension lever, a weight slidably mounted on said extension lever and a tape drive connecting said slidably mounted weight to an adjusting mechanism rigidly mounted in said base independent of said levers for moving said slidably mounted weight varying distances to variably "back-weight" said load supporting levers.

9. In a device of the class described, in combination, a base, a housing mounted on said base, load counterbalancing means mounted in said housing, load supporting levers mounted in said base, an extension lever mounted in said base, means operatively connecting said extension lever to said load counterbalancing means, means connecting said load supporting levers to said extension lever, a load receiver supported on said load supporting levers, said load receiver being located above said base, a load counterbalancing mass slidably mounted on said extension lever and mechanism rigidly mounted in said base independently of said levers and connected to said slidably mounted mass by tapes lying in the pivot line of said extension lever for moving said mass varying distances along said extension lever without causing the tension in the tapes to exert a moment on said extension lever.

10. In a device of the class described, in combination, a base, a housing, a load receiver, load counterbalancing means located in said housing, supporting means located in said base for supporting said load receiver above said base, means operatively connecting said load supporting means to said load counterbalancing means, manipulative load counterbalancing means comprising a weight movable through varying distances, said weight being slidably mounted on said supporting means and means employing driving tapes for moving said weight varying distances to variably "back-weight" said load supporting means, said tape driving means being supported in said base below said load receiver independently of said supporting means.

11. In a device of the class described, in combination, a base, load supporting levers rockably mounted in said base, a load receiver supported on said levers, an extension lever rockably mounted in said base below the level of said load receiver, means connecting said load supporting levers to said extension lever, load counterbalancing means, means connecting said extension lever to said load counterbalancing means, a slidable weighted frame mounted on said extension lever and means employing a tape drive located in said base independently of said levers and including a manually operable device extending outside said base below said load receiver for shifting said slidable weighted frame on said extension lever varying distances from the point of rockable mounting of said extension lever.

12. In a device of the class described, in combination, a base, a housing erected on said base, load counterbalancing mechanism located within said housing, load indicating means comprising a chart and an indicator actuated by said load counterbalancing mechanism, said chart having a zero indicium, a positive series of indicia and a negative series of indicia, both of said series of indicia starting with said zero indicium and extending in opposite directions therefrom, load supporting levers mounted in said base and operatively connected to said load counterbalancing mechanism, a load receiver mounted on said load supporting levers and positioned above said base, continuously variable manipulative "backweighting" means slidably mounted on said load supporting levers within said base and below said load receiver, and means employing a tape drive independent of said levers for adjusting said "back-weighting" means without in itself affecting said levers.

13. In a device of the class described, in combination, a base, a housing mounted on said base, load counterbalancing means mounted in said housing, load indicating means comprising a chart and an indicator actuated by said load counterbalancing means, said chart having a zero indicium, a positive series of indica and a negative series of indicia, both of said series of indicia starting with said zero indicium and extending in opposite directions therefrom, load supporting levers mounted in said base, an extension lever mounted in said base, means operatively connecting said extension lever to said load counterbalancing means, means connecting said load supporting levers to said extension lever, a load receiver supported on said load supporting levers, said load receiver being located above said base, continuously variable manipulative load counterbalancing means mounted on said extension lever and means employing driving tapes mounted on said base independently of said levers for moving said manipulative load counterbalancing means without itself disturbing said levers.

14. In a device of the class described, in combination, a base, a column on said base, a housing supported on said column, load counterbalancing means mounted in said housing, load indicating means comprising a chart and an indicator actuated by said load counterbalancing means, said chart having a zero indicium, a positive series of indicia and a negative series of indica, both of said series of indicia starting with said zero indicium and extending in opposite directions therefrom, load supporting levers mounted in said base, an extension lever rockably mounted in said base, a load receiver supported on said load supporting levers and located above said base, means connecting said extension lever to said load counterbalancing means, means connecting said load supporting levers to said extension lever, a weight slidably mounted on said extension lever and means employing tapes independent of said levers for moving said slidably mounted weight.

HALVOR W. HEM.